United States Patent
Hofer et al.

(10) Patent No.: US 10,065,684 B2
(45) Date of Patent: Sep. 4, 2018

(54) ROOF DEVICE

(71) Applicant: MAGNA STEYR Fahrzeugtechnik AG & Co KG, Graz (AT)

(72) Inventors: Bernhard Hofer, Graz (AT); Franz Planka, St. Andrae (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 15/297,505

(22) Filed: Oct. 19, 2016

(65) Prior Publication Data

US 2017/0144708 A1 May 25, 2017

(30) Foreign Application Priority Data

Oct. 27, 2015 (DE) .......................... 10 2015 220 978

(51) Int. Cl.
- B62D 25/06 (2006.01)
- B62D 27/02 (2006.01)
- B62D 29/00 (2006.01)

(52) U.S. Cl.
CPC .......... *B62D 25/06* (2013.01); *B62D 27/026* (2013.01); *B62D 29/005* (2013.01); *B60Y 2410/124* (2013.01)

(58) Field of Classification Search
CPC .... B62D 25/06; B62D 27/026; B62D 29/005; B62D 27/023
USPC ........................................................ 296/210
See application file for complete search history.

(56) References Cited

U.S. PATENT DOCUMENTS

| | | | |
|---|---|---|---|
| 9,440,683 B1* | 9/2016 | Donabedian | B62D 27/023 |
| 9,828,035 B1* | 11/2017 | Sassi | B62D 25/06 |
| 2006/0202518 A1* | 9/2006 | Osterberg | B62D 25/02 |
| | | | 296/193.12 |
| 2012/0061998 A1* | 3/2012 | Carsley | B62D 25/06 |
| | | | 296/210 |
| 2014/0175839 A1* | 6/2014 | Ishigame | B62D 25/06 |
| | | | 296/203.03 |
| 2016/0347377 A1* | 12/2016 | Minei | B29C 65/56 |
| 2017/0073021 A1* | 3/2017 | Roddy | B62D 25/06 |

(Continued)

FOREIGN PATENT DOCUMENTS

| | | |
|---|---|---|
| EP | 2210800 B1 | 2/2012 |
| JP | H10100936 A | 4/1998 |
| JP | H1148875 A | 2/1999 |

(Continued)

OTHER PUBLICATIONS

Machine Translation of JP2007-090946A, printed from the JPO website, Mar. 3, 2018.*

(Continued)

*Primary Examiner* — Jason S Morrow
(74) *Attorney, Agent, or Firm* — Jordan IP Law, LLC; Todd A. Vaughn

(57) ABSTRACT

A roof arrangement for a motor vehicle, and which includes a roof module and a bodywork structure for receiving the roof module. The roof module has a roof outer skin and at least one load-bearing roof bow. The roof bow, on at least one lateral end thereof, includes a tongue extending vertically downward in an installed position. The bodywork structure includes an upwardly open channel in the installed position, the tongue being received in the channel.

14 Claims, 6 Drawing Sheets

(56) References Cited

U.S. PATENT DOCUMENTS

2017/0240212 A1* 8/2017 Hinz ...................... B62D 25/06
2017/0305470 A1* 10/2017 Sato ...................... B62D 27/02

FOREIGN PATENT DOCUMENTS

| JP | 2006205870 A | 8/2006 |
| JP | 2007090946 A | 4/2007 |

OTHER PUBLICATIONS

Search and Examination Report for GB Patent No. 1618111.7, dated Feb. 8, 2017, 6 pages.

* cited by examiner

ROOF DEVICE

CROSS-REFERENCE TO RELATED APPLICATIONS

The present application claims priority 35 U.S.C. § 119 to German Patent Publication No. DE 10 2015 220 978.4 (filed on Oct. 27, 2015), which is hereby incorporated by reference in its entirety.

TECHNICAL FIELD

Embodiments relates to a roof arrangement for a motor vehicle and a method for producing such a roof arrangement.

BACKGROUND

Such a roof arrangement comprises, on the one hand, a roof module which in turn comprises at least one roof outer skin and at least one roof bow as a load-bearing element and, on the other hand, a bodywork structure for receiving the roof module. The bodywork structure may, in particular, be a roof frame.

It is known that a vehicle roof may be produced separately from a bodywork of a vehicle, as a roof module, and such a roof module may be connected retrospectively to the bodywork of the vehicle.

For example, German Patent Publication DE 102 49 412 A1 discloses a roof module for a vehicle which is provided with a planar outer skin and a support frame which is configured for attaching to the vehicle bodywork and the outer skin being fastened thereto. The outer skin and support frame are welded together by ultrasonic welding. The support frame is fastened by way of an adhesive bead to a horizontal flange on the edge of a bodywork opening.

A roof arrangement for a motor vehicle is disclosed in German Patent Publication DE 10 2010 019 827 A1 comprising a roof module, wherein a roof panel part of the roof module is connected to a lateral roof frame via an adhesive seam. A roof bow in this case is screwed by an end region to a flange of the lateral roof frame.

SUMMARY

Embodiments relate to a roof arrangement which comprises a roof module which may be produced separately, which may be painted separately, which may be produced in a simple, reliable, and fully automated manner. A further object of the invention is to specify such a simple and reliable method for producing the roof arrangement.

In accordance with embodiments, a roof arrangement for a motor vehicle, may include at least one of: a roof module having a roof outer skin and at least one load-bearing roof bow; and a bodywork structure having an upwardly open channel in an installed position, and which is configured to receive the roof module, wherein the roof bow, on at least one lateral end thereof, has a tongue extending vertically downward in an installed position, the tongue being received in the channel.

By the configuration of a channel on the bodywork structure, in particular, in a roof frame or side member, and a tongue on the end of the roof bow which is received in the channel, the load-bearing component, i.e., the roof bow, and thus, the entire roof module may be fastened to the bodywork from above, by simply being positioned thereon. By way of the walls of the channel a positive connection is provided between the tongue and the channel, which counteracts a lateral displacement of the roof module during mounting, so that further fastening points such as welding points or rivets between the roof bow and the bodywork structure are generally able to be dispensed with. In this case, however, the channel may be configured to be sufficiently wide that it is possible to compensate for tolerances of the roof module.

In accordance with embodiments, the tongues may be generally configured at both ends of the roof bow, and accordingly, channels may be configured on both sides of the bodywork structure to receive the tongues.

In accordance with embodiments, a plurality of such roof bows, at least two roof bows, are also used with a common roof outer skin, the lateral tongues of the roof bows being received in the channels of the bodywork structure.

In accordance with embodiments, the channel and the tongue substantially extend in a longitudinal direction of the vehicle, in particular, at the sides of a roof opening of the vehicle bodywork. Alternatively or additionally, the channel and tongue may also extend in the vehicle transverse direction.

In turn, the roof outer skin may also be fastened to the bodywork structure, and namely, may be particularly fastened outside the channel to the bodywork structure. The roof outer skin may be fastened by an adhesive connection to the bodywork structure.

In accordance with embodiments, the bodywork structure in an edge region forms a flange region, wherein the roof outer skin is fastened to the flange region by way of adhesive. The flange region may be arranged, in particular, horizontally in the vehicle. When positioning the roof module, the tongue of the roof bow may be introduced at the same time into the channel and the edge of the roof outer skin may be positioned onto an adhesive bead on the horizontal flange.

In accordance with embodiments, the channel may be filled with adhesive, even when the roof module is being positioned, and the roof bow may be fastened to the bodywork structure via the tongue by way of the adhesive in the channel.

In accordance with embodiments, the roof bow and the roof outer skin may be exclusively fastened via adhesive connections to the bodywork structure.

In accordance with embodiments, the roof bow and the roof outer skin may be at least partially fastened together on the contact surfaces thereof by an adhesive, such as, for example, a mounting adhesive. Such a mounting adhesive may comprise a lining adhesive. As a result, it is possible to produce a roof module which may be treated independently of the bodywork, in particular, may be painted.

In accordance with embodiments, the roof module may be provided with further components, for example, with an insulating mat or an antenna, before the fastening to the bodywork structure takes place. Variable thermal expansion between the roof outer skin and the bodywork may be taken up by the adhesive connection between the roof outer skin and the bow.

In accordance with embodiments, the roof bow and the roof outer skin may also be at least partially fastened together by adhesive tapes, in particular, by foam adhesive tapes, which may be only attached locally. As a result, in particular, a temporary fastening may be produced between the roof bow and the roof outer skin and it is possible to dispense with a curing time for a mounting adhesive, whereby shorter cycle times may be implemented in mass production.

In accordance with embodiments, the components of the roof module, such as the roof outer skin and the roof bow, may be separately painted and/or coated before the mounting thereof. The adhesion of the adhesives on the components may also be enhanced thereby. Alternatively, a roof outer skin and a roof bow may be welded together, wherein the entire welded group may be subsequently painted. In this case, for example, a lining adhesive may once again be used on the body-in-white between the roof outer skin and the roof bow, said adhesive curing by way of the temperature during the painting process.

In accordance with embodiments, the channel at its upwardly open end may comprise at least one guide chamfer, such as, for example, guide chamfers on both side walls of the channel. In this way, easier positioning of the roof module is possible.

In accordance with embodiments, the channel and the tongue of the roof bow may have a non-linear shape, in particular, a U-shape in plan view. The entire roof bow may also have such a non-linear, in particular U-shaped, profile. By way of this non-linear shape, it is achieved that undesirable displacements of the roof module relative to the bodywork structure, in particular when the adhesive is not yet cured, may be prevented or hindered in several spatial directions, in particular even in all directions of the fastening plane.

In accordance with embodiments, the roof outer skin may be manufactured from a different material from the roof bow. In particular, the roof bow may be made of metal and the roof outer skin may be made of plastics.

In accordance with embodiments, during production of a roof arrangement, the roof bow and the roof outer skin may at least be partially fastened together on the contact surfaces thereof by an adhesive, and the roof module comprising the roof bow and the roof outer skin may be subsequently positioned from above onto the bodywork structure so that the tongue of the roof bow may be received in the channel. During the positioning, adhesive may be located in the channel so that the roof module and the bodywork structure are bonded together.

In accordance with embodiments, the roof bow and roof outer skin may be bonded together by way of a mounting adhesive, in particular, a lining adhesive, and additionally with a rapid adhesive such as double-sided adhesive tapes or some other rapid gripping mechanism, such as hook and loop fastenings, in particular "Dual Locks" manufactured by 3M. The mounting may then be able to be continued, even when the mounting adhesive is not yet cured, in particular the roof module may be able to be immediately positioned onto the bodywork structure.

In accordance with embodiments, the roof outer skin and the bodywork structure may be painted separately from one another before the joining thereof, in particular, in different colours from one another. The painting may take place at separate times and/or separate locations and thus independently of one another. The roof module may be positioned onto the bodywork only after the components have been painted. By the independent production and the possibility of a simple connection to the bodywork, different types of roof module may also be used in a modular manner together with a predetermined bodywork structure and alternatively fastened to the same bodywork structure, for example a full roof, a sliding roof, a tilting roof and/or a high roof.

DRAWINGS

Embodiments will be illustrated by way of example in the drawings and explained in the description below.

DESCRIPTION

Figure 1:
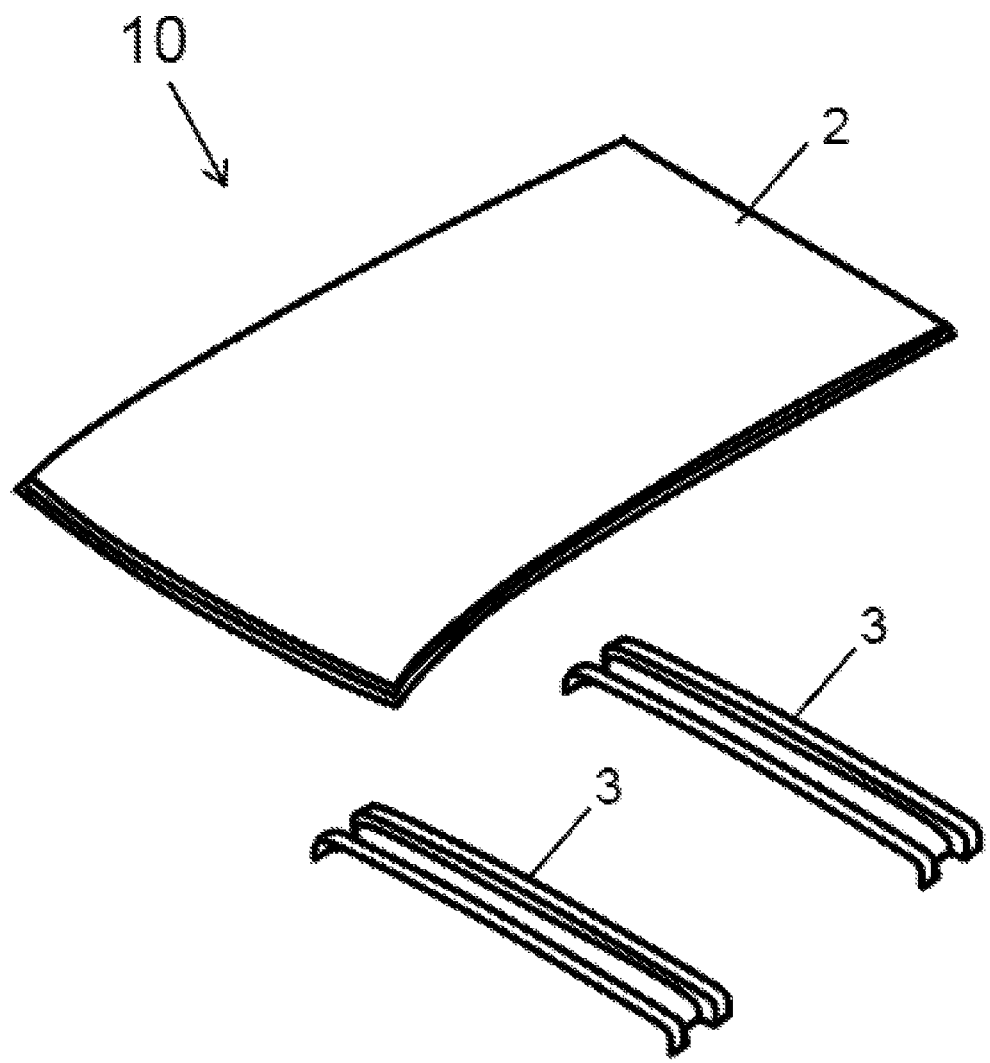
FIG. 1 illustrates a schematic three-dimensional view of a roof module of a roof arrangement, in accordance with embodiments.

As illustrated in FIG. 1, a roof module 10 of a roof arrangement according to the invention is shown, wherein the roof module 10 comprises a roof outer skin 2 and two roof bows 3 which are not yet fastened to the roof outer skin 2. The roof bows 3 are mounted in the transverse direction of the vehicle in a front and rear region of the roof outer skin 2.

Figure 2:
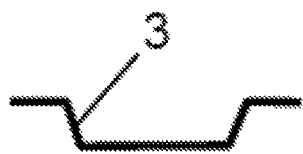
FIG. 2 illustrates a sectional view of the cross-section of a roof bow of the roof module of FIG. 1.

As illustrated in FIG. 2, the roof bows 3 in each case comprise a substantially flat U-shaped cross-section. This U-shaped cross-section extends in each case over the entire roof bow 3, including the lateral ends thereof which serve for fastening to a bodywork structure 1.

Figure 3:
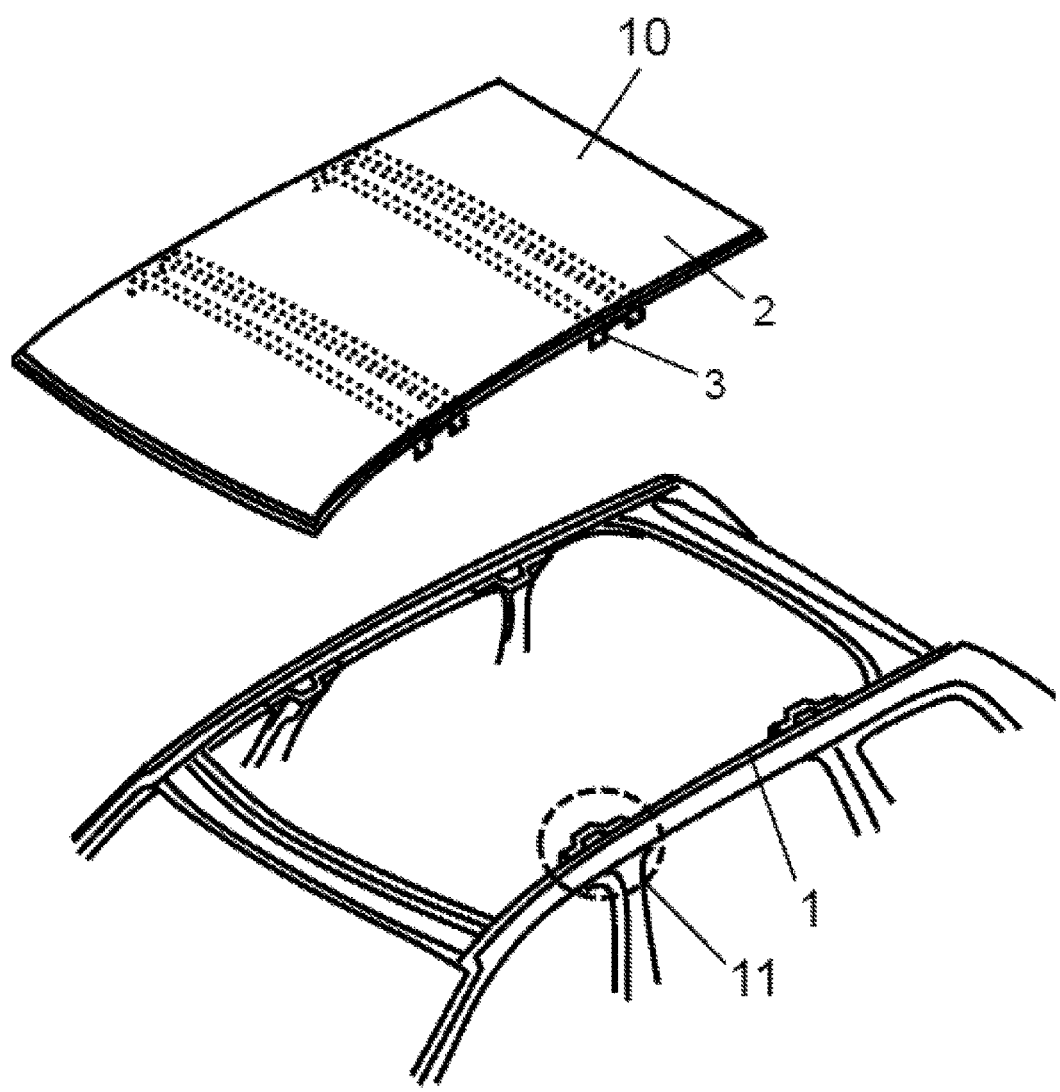
FIG. 3 illustrates a schematic three-dimensional view of a roof arrangement with the roof module of FIG. 1.

As illustrated in FIG. 3, a roof arrangement in accordance with embodiments includes a finished roof module 10 comprising roof bows 3 and a roof outer skin 2 fastened to one another, for example, by adhesive bonding. A bodywork structure 1 of the motor vehicle, in particular, a roof frame, is to receive the roof module 10. The roof module 10 may be fastened to the bodywork structure 1 in connecting regions 11, in the region of the ends of the roof bows 3.

Figure 4:
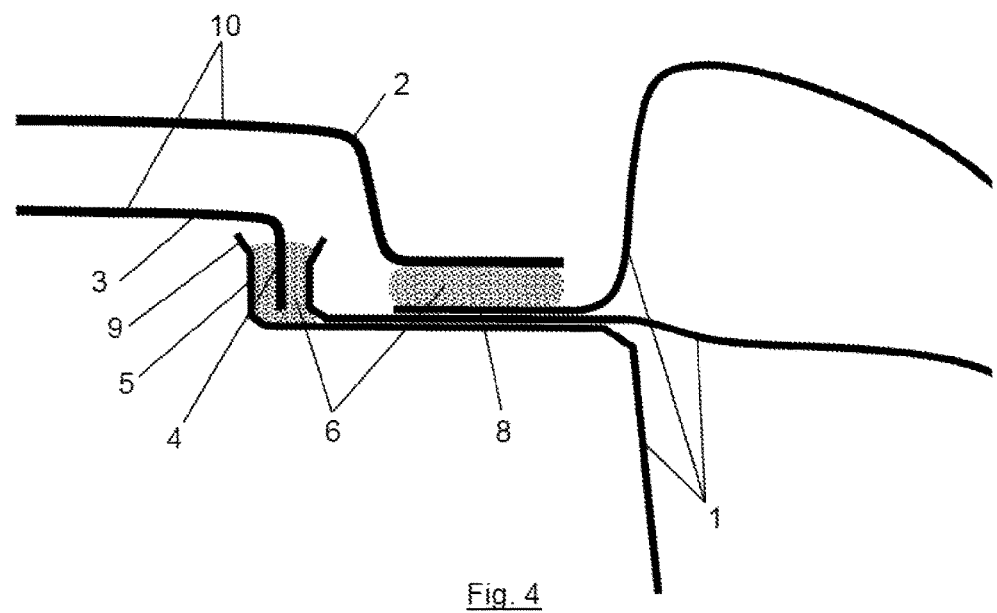
FIG. 4 illustrates a front, sectional view of a connecting region of the roof arrangement of FIG. 3.

As illustrated in FIG. 4, a front, sectional view of a connecting region of FIG. 3 provided. The bodywork structure 1 defines at a lateral edge thereof a channel 5 which may be filled with adhesive 6. A tongue 4 which forms the outermost edge of a roof bow 3 may be received in the channel 5. In the installed position, the tongue 4 may be configured to extend, in an installed position, vertically downward and, therefore, may be easily introduced into the vertically upward open channel 5. For further simplification of the introduction of the tongue 4 into the channel 5, the channel 5 at both upper ends comprises guide chamfers 9, i.e., enlargements of the channel 5 diameter in the upward direction.

A horizontally located flange region 8 may be formed toward the inside of the channel 5 on the bodywork structure 1, the roof outer skin 2 of the roof module 10 being fastened thereto via an adhesive bead 6. The roof outer skin 2 and the roof bow 3 are therefore fastened to the bodywork structure 1 separately and independently of one another.

Figure 5:
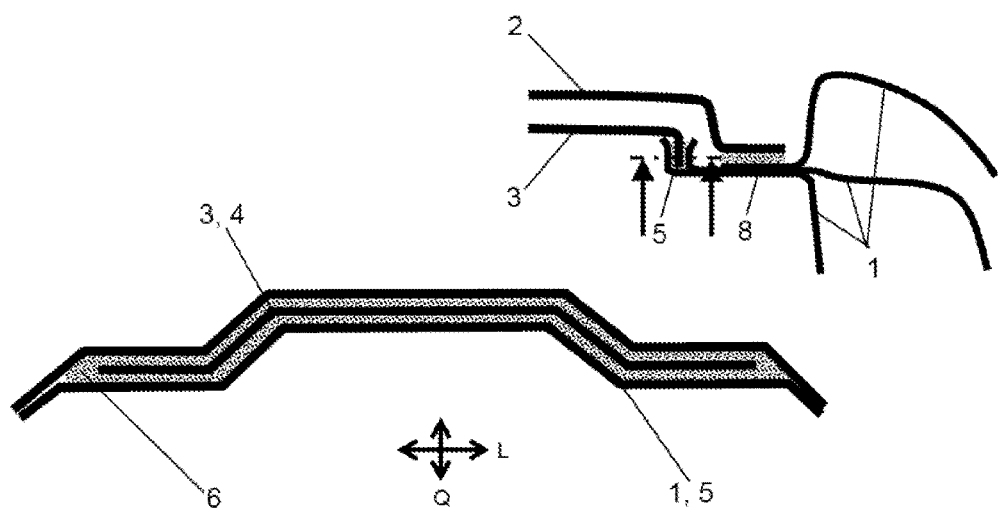
FIG. 5 illustrates an upper, right sectional view of a detail of a connecting region of a roof arrangement, corresponding to the section through the channel of FIG. 4.

As illustrated in FIG. 5, the connecting region 11 from above, corresponds to the section illustrated top right (corresponding to FIG. 4) in FIG. 5, through the channel 5.

The channel 5 may be substantially configured in the vehicle longitudinal direction L, but not in a linear manner, and may have a planar U-shape. Since an inadvertent displacement of the tongue 4 in the channel 5 in a longitudinal direction parallel to the walls of the channel 5 may take place more easily than a displacement in a direction transversely to the channel walls, the channel may be not configured to be linear so that a displacement in the entire plane spanned by the vehicle longitudinal direction L and the vehicle transverse direction Q may be hindered.

Figure 6:
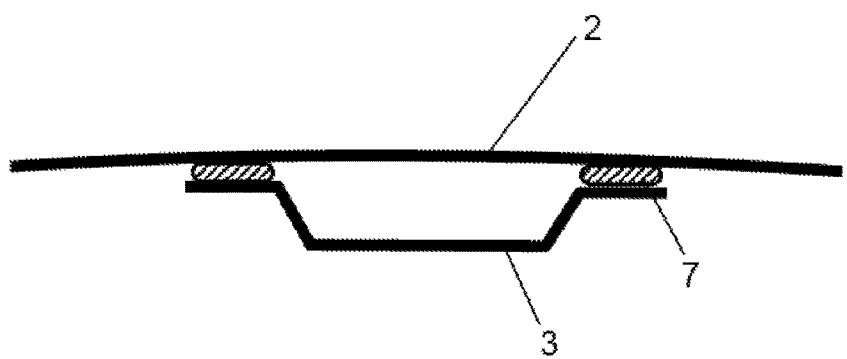
FIG. 6 illustrates a side, sectional view of a roof module, in accordance with embodiments.

As illustrated in FIG. 6, the fastening of a roof bow 3 to a roof outer skin 2 for forming a roof module is provided from a side view. Two spaced apart contact surfaces are formed between the roof bow 3 and the roof outer skin 2, namely, horizontal raised portions configured at the front and rear on the roof bow 3, and/or horizontally extending ends of the U-shaped cross section of the roof bow 3. These raised portions of the roof bow 3 are bonded by way of lining adhesive 7 to the roof outer skin 2.

The term "coupled," or "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 Bodywork structure
2 Roof outer skin
3 Roof bow
4 Tongue
5 Channel
6 Adhesive
7 Lining adhesive
8 Flange region
9 Guide chamfer
10 Roof module
11 Connecting region
L Vehicle longitudinal direction
Q Vehicle transverse direction

What is claimed is:

1. A motor vehicle roof arrangement, comprising:
a roof module including a roof outer skin and at least one load-bearing roof bow having on at least one lateral end thereof, a tongue extending vertically downward in an installed position; and
a bodywork structure to receive the roof module, the bodywork structure including closed ends which define a channel configured to receive an adhesive and the tongue to thereby permit fastening of the roof bow to the bodywork structure via the tongue.

2. The motor vehicle roof arrangement of claim 1, wherein the channel and the tongue substantially extend in a longitudinal direction of the motor vehicle.

3. The motor vehicle roof arrangement of claim 1, wherein the roof outer skin is fastened to the bodywork structure outside of the channel.

4. The motor vehicle roof arrangement of claim 1, wherein the roof outer skin is fastened to the bodywork structure by an adhesive connection.

5. The motor vehicle roof arrangement of claim 1, wherein the roof bow and the roof outer skin are exclusively fastened to the bodywork structure via an adhesive connection.

6. The motor vehicle roof arrangement of claim 1, wherein the roof bow and the roof outer skin are at least partially fastened together on contact surfaces thereof by an adhesive.

7. The motor vehicle roof arrangement of claim 1, wherein the roof bow and the roof outer skin are at least partially fastened together by a foam adhesive.

8. The motor vehicle roof arrangement of claim 1, wherein:
the bodywork structure, in an edge region thereof, defines a flange region that extends horizontally, and
the roof outer skin is fastened to the flange region by way of an adhesive.

9. The motor vehicle roof arrangement of claim 1, wherein the channel, at an upwardly open end thereof, comprises at least one guide chamfer.

10. The motor vehicle roof arrangement of claim 1, wherein the channel and the tongue of the roof bow in the installed position have a non-linear shape.

11. The motor vehicle roof arrangement of claim 1, wherein the roof outer skin is composed of material different than that of the roof bow.

12. The motor vehicle roof arrangement of claim 1, wherein the roof bow is composed of metal and the roof outer skin is composed of plastic.

13. A method for producing a roof arrangement, comprising:
providing a roof module including a roof outer skin and at least one load-bearing roof bow having on at least one lateral end thereof, a tongue extending vertically downward in an installed position;
providing a bodywork structure to receive the roof module, the bodywork structure including closed ends which define a channel configured to receive an adhesive and the tongue to thereby permit fastening of the roof bow to the bodywork structure via the tongue;
fastening, at least partially, the roof bow and the roof outer skin together on contact surfaces thereof via an adhesive; and
positioning the roof module from above onto the bodywork structure so that the tongue of the roof bow is received in the channel.

14. A motor vehicle roof arrangement, comprising:
a bodywork structure having closed ends which define a channel to receive an adhesive therein; and
a roof module including a roof outer skin, at least one load-bearing roof bow having on at least one lateral end thereof, and a tongue for receipt in the channel of the bodywork structure such that the roof bow is fastened to the bodywork structure via the tongue by way of the adhesive.

* * * * *